US010261168B1

(12) United States Patent
Aditya et al.

(10) Patent No.: US 10,261,168 B1
(45) Date of Patent: Apr. 16, 2019

(54) REMOTE LOCALIZATION AND RADIO-FREQUENCY IDENTIFICATION USING A COMBINATION OF STRUCTURAL AND ANTENNA MODES SCATTERING RESPONSES

(71) Applicant: King Abdulaziz City for Science and Technology, Riyadh (SA)

(72) Inventors: Sundar Aditya, Los Angeles, CA (US); Hatim M. Behairy, Riyadh (SA); Andreas F. Molisch, Los Angeles, CA (US)

(73) Assignees: KING ABDULAZIZ CITY FOR SCIENCE AND TECHNOLOGY, Riyadh (SA); UNIVERSITY OF SOUTHERN CALIFORNIA, Los Angeles, CA (US)

(*) Notice: Subject to any disclaimer, the term of this patent is extended or adjusted under 35 U.S.C. 154(b) by 0 days.

(21) Appl. No.: 15/916,378

(22) Filed: Mar. 9, 2018

(51) Int. Cl.
| | | |
|---|---|---|
| *H04W 24/00* | (2009.01) | |
| *G01S 5/02* | (2010.01) | |
| *G01S 5/12* | (2006.01) | |
| *G01S 13/87* | (2006.01) | |
| *H04W 64/00* | (2009.01) | |
| *H04L 29/08* | (2006.01) | |
| *H04M 1/725* | (2006.01) | |
| *H04W 4/02* | (2018.01) | |

(52) U.S. Cl.
CPC .............. *G01S 5/0278* (2013.01); *G01S 5/12* (2013.01); *G01S 13/878* (2013.01); *H04L 29/08657* (2013.01); *H04M 1/72519* (2013.01); *H04M 1/72522* (2013.01); *H04W 4/02* (2013.01); *H04W 64/00* (2013.01)

(58) Field of Classification Search
CPC ........ G01S 5/0278; G01S 5/12; G01S 13/878; H04M 1/72522; H04L 29/08657; H04W 4/02; H04W 64/00
USPC ............................... 455/456.1, 456.6, 550.1
See application file for complete search history.

(56) References Cited

U.S. PATENT DOCUMENTS 7,965,867 B2   6/2011 Lanz
8,217,760 B2   7/2012 Wild et al.
(Continued)

OTHER PUBLICATIONS

Hu et al., "Study of a Uniplanar Monopole Antenna for Passive Chipless UWB-RFID Localization System", IEEE Transcations on Antennas and Propagation, Feb. 2010, 8 pages.
(Continued)

*Primary Examiner* — Danh C Le
(74) *Attorney, Agent, or Firm* — Andrew M. Calderon; Roberts Mlotkowski Safran Cole & Calderon, P.C.

(57) ABSTRACT

The present disclosure generally relates to localization and, more particularly, to remote localization and radio-frequency identification using a combination of structural and antenna mode scattering responses. A method and system include receiving location data of an object from a plurality of transmitter-reader pairs (TRPs); generating a plurality of first ellipses representing the received location data; determining blocking likelihoods at points of intersection between the plurality of first ellipses; generating additional ellipses representing additional location data received from additional TRPs; and updating the blocking likelihoods at points of intersection between the plurality of first ellipses and the additional ellipses.

20 Claims, 4 Drawing Sheets

(56) References Cited

U.S. PATENT DOCUMENTS

| | | | | |
|---|---|---|---|---|
| 8,253,621 | B1* | 8/2012 | Friesel | G01S 7/003 |
| | | | | 342/147 |
| 8,446,253 | B2 | 5/2013 | Ramchandran et al. | |
| 8,630,804 | B2* | 1/2014 | Simon | G01S 5/16 |
| | | | | 701/468 |
| 8,786,440 | B2 | 7/2014 | Clare et al. | |
| 8,810,388 | B2 | 8/2014 | Jacobs et al. | |
| 2006/0238407 | A1* | 10/2006 | Bourdelais | G01S 7/411 |
| | | | | 342/90 |
| 2009/0156231 | A1* | 6/2009 | Versteeg | G01S 5/0252 |
| | | | | 455/456.1 |
| 2009/0265407 | A1* | 10/2009 | Hodzic | G06F 7/548 |
| | | | | 708/442 |
| 2013/0295857 | A1* | 11/2013 | Nuutinen | H04B 17/391 |
| | | | | 455/67.12 |
| 2013/0309415 | A1* | 11/2013 | Swaminathan | C23C 16/52 |
| | | | | 427/569 |
| 2013/0314534 | A1* | 11/2013 | Hinman | G06Q 10/08 |
| | | | | 348/143 |
| 2013/0337789 | A1* | 12/2013 | Johnson | H04W 4/02 |
| | | | | 455/414.1 |
| 2016/0259032 | A1* | 9/2016 | Hehn | G01S 5/0289 |
| 2017/0074980 | A1* | 3/2017 | Adib | G01S 7/35 |
| 2017/0168134 | A1* | 6/2017 | Jenwatanavet | H04W 4/80 |

OTHER PUBLICATIONS

Dardari et al., "Passive Ultrawide Bandwidth RFID", IEEE, 2008, 6 pages.

Penttila et al., "Radar cross-section analysis for passive RFID systems", IEEE, Feb. 2006, 7 pages.

Aditya et al., "Bayesian Multi-Target Localization using Blocking Statistics in Multipath Environments", IEEE, Jun. 2015, 6 pages.

Guidi et al. "Analysis of UWB Tag Backscattering and Its Impact on the Detection Coverage", IEEE Transcations on Antennas and Propagation, Aug. 2014, 12 pages.

Bletsas et al. "Improving Backscatter Radio Tag Efficiency", IEEE Transactions on Microwave Theory and Techniques, Jun. 2010, 8 pages.

* cited by examiner

REMOTE LOCALIZATION AND RADIO-FREQUENCY IDENTIFICATION USING A COMBINATION OF STRUCTURAL AND ANTENNA MODES SCATTERING RESPONSES

FIELD OF THE INVENTION

The present disclosure generally relates to localizing targets in an environment and, more particularly, to remote localization and radio-frequency identification using a combination of structural and antenna modes scattering responses.

BACKGROUND

Remote localization, coupled with radio-frequency identification (RFID), has a potential to overcome a number of bottlenecks in a variety of applications. For example, queues in supermarkets can be significantly reduced, if not eliminated, if an object's location in a shopping cart can be determined accurately and the corresponding product information can be read for billing. Other applications for remote localization include inventory tracking in a warehouse and remote wildlife monitoring, among other examples.

SUMMARY

In an aspect of the disclosure, a method comprises: receiving, by a computing device, location data of an object from a plurality of transmitter-reader pairs (TRPs); generating, by the computing device, a plurality of first ellipses representing the received location data; determining, by the computing device, blocking likelihoods at points of intersection between the plurality of first ellipses; generating, by the computing device, additional ellipses representing additional location data received from additional TRPs; and updating, by the computing device based on the additional ellipses, the blocking likelihoods at points of intersection between the plurality of first ellipses and the additional ellipses, wherein the location data and the additional location data include data from a structural mode of an antenna associated with the object.

In an aspect of the disclosure, a computer program product for identifying an object location, the computer program product comprises a computer readable storage medium having program instructions embodied therewith, the program instructions executable by a computing device to cause the computing device to: select a plurality of transmitter-reader pairs (TRPs) in an environment; generate a plurality of first ellipses representing location data received from the selected TRPs; determine a blocking likelihood at points of intersection between the plurality of first ellipses; generate additional ellipses representing additional location data received from additional TRPs; and update, based on the additional ellipses, the blocking likelihood at the points of intersection between the plurality of first ellipses and the additional ellipses, wherein the location data and the additional location data include data from a structural mode of an antenna associated with the object.

In an aspect of the disclosure, a system comprises a CPU, a computer readable memory and a computer readable storage medium associated with a computing device; program instructions to generate a plurality of first ellipses representing multipath components (MPCs) extracted from a plurality of transmitter-reader pairs (TRPs); program instructions to determine a blocking likelihood at points of intersection between the plurality of first ellipses; program instructions to generate additional ellipses representing MPCs extracted from additional TRPs; and program instructions to update, based on generating the additional ellipses, the blocking likelihoods at the points of intersection between the first plurality of ellipses and the additional ellipses, wherein the MPCs include data from a structural mode of an antenna associated with an object, and the program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
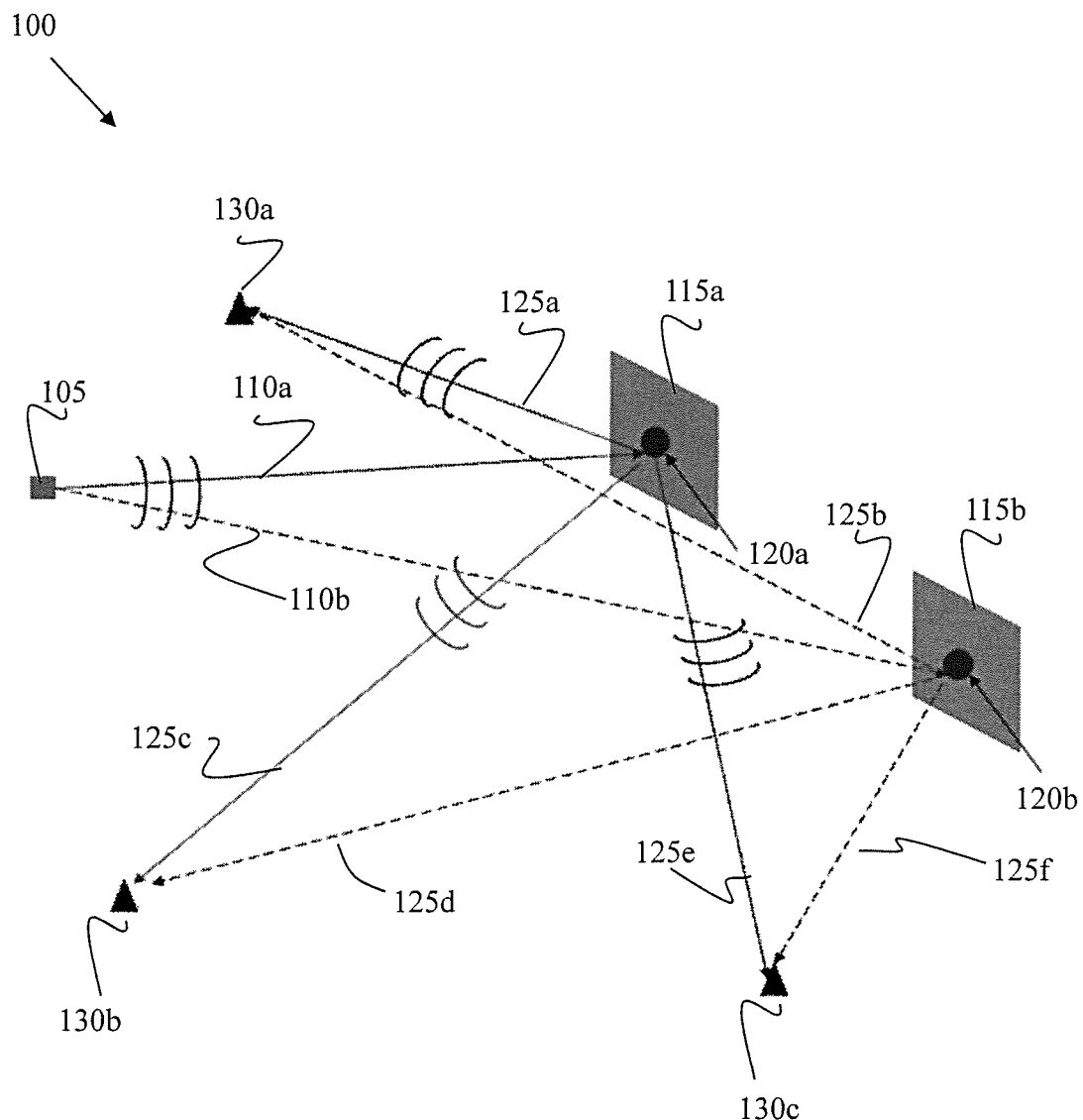
FIG. 1 shows an illustrative radar environment for localization in accordance with aspects of the invention.

The present disclosure generally relates to localizing targets in an environment and, more particularly, to systems and methods for remote localization and radio-frequency identification using a combination of structural and antenna modes scattering responses. In embodiments, the systems and method described herein can provide remote localization of various objects within an environment, even if obstacles exist in the environment.

In embodiments, remote localization of various objects is accomplished by receiving location data of each object from a transmitter (TX) device and a related receiver, e.g. a reader (RX) device. The TX device emits a transmitter signal into the environment, which travels through the environment until it is received by an object desired to be identified. More specifically, the object includes an antenna, such as a tag antenna (tag), which receives the transmitter signal. After reception, the tag will emit its own backscattering signal within the environment. This backscattering signal is received by the RX device. Therefore, the TX device and the RX device act as a pair, referred to as a TX-RX pair (TRP).

The signal backscattered by the tag associated with the object contains various bits of information, such as an identifier of the tag, like a serial number. The backscattered signal includes multi-path components (MPCs), which depend on details of the signal travel, such as whether there were direct paths (DPs) during signal travel and/or indirect paths (IPs) during signal travel. An example of an indirect path includes a signal path of TX→Tag→Wall→RX.

Further included in the backscattered signal are two components: (i) a structural mode and (ii) an antenna mode. The backscattered signal, also referred to as a far-field backscattered signal if the transmitter and receiver are located in the far-field of the tag, is a superposition of these two components. Both the structural mode and the antenna mode contain location information that can be exploited to determine an object location. In embodiments, the antenna mode by itself can be used to localize the various objects within the environment. In further embodiments, the structural mode and the antenna mode can both be used to localize the various objects within the environment. Further still in additional embodiments, the structural mode in of itself can be used to localize objects within the environment.

Although the systems and methods described hereafter are with regard to exemplary methods, and/or computer program products, it should be understood that other implementations are also contemplated by the present disclosure as described herein. For example, other devices, systems, appliances, and/or computer program products according to embodiments of the present disclosure will be or become apparent to one of ordinary skill in the art upon review of the drawings and detailed description. It is intended that all such additional other devices, systems, appliances, processes, and/or computer program products be included within the scope of the present disclosure.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects. Furthermore, aspects of the present disclosure may take the form of a computer program product embodied in one or more computer readable storage medium(s) having computer readable program code embodied thereon.

Figure 4:
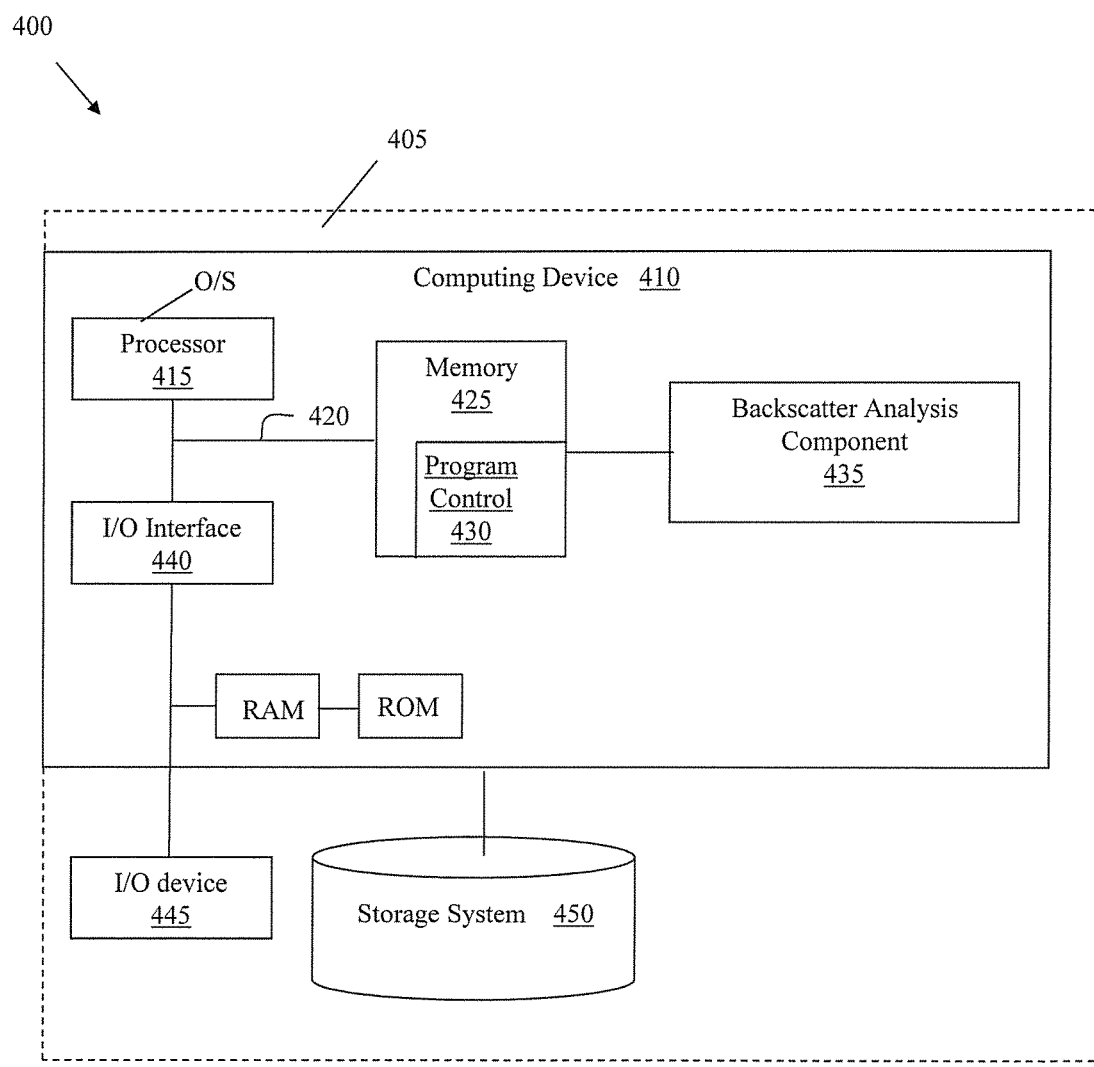
FIG. 4 shows an illustrative infrastructure for remote localization in accordance with aspects of the invention.

The computer readable storage medium (or media) having computer readable program instructions thereon causes one or more computing processors to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. The computer readable storage medium is not to be construed as transitory signals per se; instead, the computer readable storage medium is a physical medium or device which stores the data. The computer readable program instructions may also be loaded onto a computer, for execution of the instructions, as shown in FIG. 4.

FIG. 1 shows an illustrative radar environment 100 for localization in accordance with aspects of the invention. More specifically, FIG. 1 illustrates a use-case scenario in which a tag antenna (tag), such as tags 120a and 120b, each contain a unique identification (ID). The tags 120a and 120b can be affixed to an object that needs to be localized, such as objects 115a and 115b. Radar environment 100 further includes a transmitter (TX) device 105 emitting a signal, such as transmitter signals 110a and 110b. These transmitter signals 110a and 110b flow through the environment, eventually reaching the objects 115a and 115b, and particularly the tags 120a and 120b.

The tags 120a and 120b receive the signals 110a and 110b, which scatter off the tags 120a and 120b into various directions. This is referred to as backscattering. The backscattered signals, illustrated as 125a, 125b, 125c, 125d, 125e, and 125f, flow through the environment until received by one or more reader (RX) devices, e.g. readers 130a, 130b, and 130c. If direct paths (DPs) exist to at least three TX-RX pairs (TRPs), then a tag, such as tags 120a and 120b, can be localized using triangulation and its product information read. A DP can be described as an unobstructed line-of-sight path from a tag to both a TX device and an RX device. Further, if information about the environment, e.g., the location of the walls relative to TX device and the RX device are known, also the indirect paths (IPs) can be used for localization.

The backscattered signals 125a, 125b, 125c, 125d, 125e, and 125f generated from the tags 120a and 120b are received at multiple reader (RXs) devices 130a, 130b, and 130c. At least three DPs, as shown in FIG. 1, are necessary to localize a tag, such as tags 120a and 120b. By localizing the tags 120a and 120b, it is possible to localize objects that include the tags, such as objects 115a and 115. Each of the far-field backscattered signals 125a, 125b, 125c, 125d, 125e, and 125f include a superposition of two components, (i) a structural mode and (ii) an antenna mode.

The structural mode arises due to electric currents induced on a surface of the tag, such as tags 120a and 120b, by an incoming radio-frequency (RF) signal. The structural mode is a function of the shape and size of the antenna, as an example. Hence, all tags of a particular model can be expected to have the same structural mode. The antenna mode, on the other hand, is that portion of the incoming RF signal that is first absorbed by the tag, such as tags 120a and 120b, reflected back along its feed line due to a load mismatch and finally re-radiated.

The antenna mode can be used to encode a unique ID for each tag by a technique known as load modulation. In load modulation, the load attached to the tag is varied over time. Examples of choices for the load are open-circuit and short-circuit, which each can encode a binary sequence of 0's and 1's unique to a particular tag. Comparing amplitudes of the structural mode to the antenna mode over a period of time, such as nanoseconds (ns), shows various differences between the two modes. For example, a structural mode peak can be received first at a time $T1=5.328$ ns, and hence can be called an early-time response. In comparison, an antenna mode peak can arrive at a time $T2=5.843$ ns, and hence can be called a late-time response.

More specifically, an incoming RF signal needs to travel an additional distance, equal to twice the length of the feed line, before it can be re-radiated. Hence, the antenna mode starts a short duration after the structural mode. For this reason, the structural and antenna modes are also referred to as the early-time and late-time response, respectively. Continuing with an analysis of the structural and antenna modes, the structural mode does not depend on the load. Therefore, the structural load stays the same throughout. In comparison, the antenna mode switches polarity between open and short circuit loads.

Although the structural mode contains valuable information about the tag location, such as a time-of-arrival, it typically could not be used for tag localization. One reason can be that some radio-frequency identification (RFID) applications may not require remote localization. For example, a tag may be placed in close proximity to the reader, either by a person or an automated mechanism. The closeness of the tag may be sufficient to merely detect the presence of a tag, before reading the product information. Another reason can be that while remote localization may be needed for an application, two or more tags of a same model may have the same structural mode. Hence, it might not be possible to distinguish between the two or more tags of a same model based on their structural mode alone. This may create an ambiguity during triangulation, which may make localization challenging.

Another reason is that the structural mode may depend on a size and a shape of the tag antenna. Since tags likely need to have a small form factor, the structural mode can be weaker than some background clutter present. However, by overcoming the above presented challenges, location information contained in the structural mode may be exploited as well. This would result in a signal-to-noise ratio (SNR) gain, which would yield better location estimates for the tags.

To overcome the problem of two or more tags of a same model having the same structural mode, and therefore having the same radar signature, a Bayesian estimation based multi-target localization (MTL) algorithm can be implemented with the systems and methods of the present invention. The Bayesian MTL algorithm is capable of localizing an unknown number of targets/objects, all having the same radar signature. Hence, even in the absence of a unique antenna mode response, this algorithm could still be used for localizing multiple tags, provided the background clutter (i.e. challenge (c)) is removed.

Figure 3:
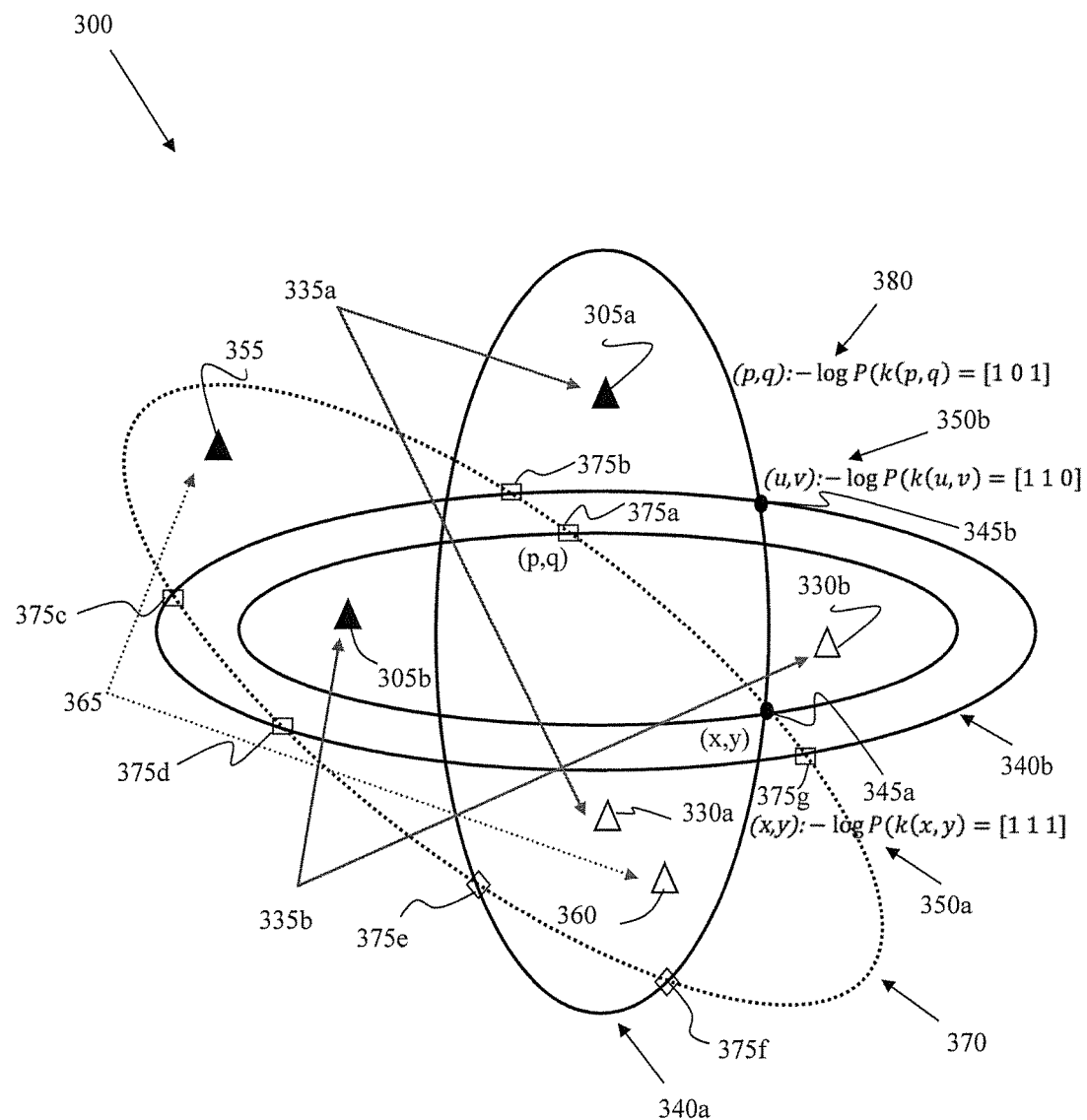
FIG. 3 shows a framework for a localization determination using updated blocking likelihoods in accordance with aspects of the invention.

Looking at the Bayesian MTL algorithm, when three or more ellipses intersect at a point, as shown in FIG. 3, it can be assumed that they are DPs. It can then be possible to compute the joint probability that a line-of-sight (LoS) exists to the TXs and RXs in question at the point of intersection. When this probability is high enough, it can be concluded that a target/object is present. The MTL problem with single antenna TX devices and RX devices is modeled as a Bayesian estimation problem where the joint DP blocking distribution plays the role of a prior. A sub-optimal polynomial time algorithm to solve this problem is proposed.

A system model for which the Bayesian MTL algorithm can be derived can be a distributed multiple-input and multiple-output (MIMO) radar system with $M_X$ TXs and $M_r$ RXs, each equipped with a single omni-directional antenna and deployed in an unknown environment. An unknown number of stationary point targets are present and the objective is to localize all of them. It can be assumed that the environment has non-target scatterers too, which either can block some target with respect to some TX device and/or RX device, and/or give rise to multipath (indirect paths). The location of these non-target scatterers is assumed to be unknown: we assume only the knowledge of TX device and RX device locations. The number of transmit-receive pairs (TRPs), denoted by n, equals $M_X M_r$. For the Bayesian MTL algorithm, the convention is that the i-th TRP (i=1, . . . , n) consists of the $i_T$-th TX and $i_R$-th RX, where $i_T$=(i−1) modulo $M_X$+1 and $i_R$=[(i−1)/MX]+1.

For simplicity, attention is restricted to a two-dimensional (2-D) case, where all the TX devices, RX devices and targets/objects are assumed to lie on a plane. The extension to a three-dimensional (3-D) case is quite straightforward. Let the TX device and the RX device for the i-th TRP be located at $(c_i,d_i)$ and $(a_i, b_i)$, respectively. We assume that the TX devices use orthogonal signals so that the RX devices can distinguish between the TX devices. Multipath components (MPCs) are extracted whenever their signal strength exceeds a threshold. All MPCs that do not involve a reflection off a target are assumed to be removed by a background cancellation technique. An MPC involving more than two reflections is assumed to be too weak to be detected. Furthermore, DPs can also be blocked by scatterers in the environment and finally, two or more MPCs could have their time of arrival (ToA) so close to one another that they can be un-resolvable due to finite bandwidth. Under this model, each extracted MPC is either (i) a DP to one or more targets, (ii) an indirect path (TX-scatterer-target-RX or TX-target-scatterer-RX) or (iii) a noise peak. Due to finite resolution, it is possible for an MPC to be a combination of (i), (ii) and (iii) as well.

Each MPC gives rise to a ToA estimate which, in turn, corresponds to a range estimate. If only additive white Gaussian noise (AWGN) is present at the RX, then each ToA estimate is perturbed by Gaussian errors having variance $\hat{\sigma}^2$. Thus, for a DP, the true range of a target w.r.t its TRP is corrupted by AWGN of a variance represented by $\sigma^2 = c^2 \hat{\sigma}^2$, where c is the speed of light in the environment.

Suppose the i-th TRP has $N_i$ MPCs extracted from its signal. Let $r_i = [r_{i1}\ r_{i2}\ r_{iNi}] \in \mathbb{R}^{1 \times Ni}$ denote the vector of range estimates at the RX of the i-th TRP and let $r = [r_1\ r_2\ r_n] \in \mathbb{R}^{1 \times N1 N2 \cdots Nn}$ denote the stacked vector of range estimates from all TRPs. If $r_{ij}$ is a DP corresponding to a target at $(x_t, y_t)$, then the conditional probability density function (pdf) of $r_{ij}$ given $(x_t, y_t)$, denoted by $f_{DP}(r_{ij}|x_t,y_t)$, is normally distributed with mean $r_i(x_t,y_t)$ and variance $\sigma^2$, where $r_i(x_t,y_t) = \sqrt{((x_t-c_i)^2+(y_t-b_i)^2)} + \sqrt{((x_t-+(y_t-d_i)^2)}$ is the true range of $(x_t,y_t)$ w.r.t the i-th TRP.

In order to model the blocking in the environment, the following variables are defined:

$$k_i(x_t, y_t) = \begin{cases} 0, & \text{if } (x_t, y_t) \text{ is blocked w.r.t the } i\text{-th TRP} \\ 1, & \text{otherwise} \end{cases} \quad (1)$$

$k_i(x_t, y_t)$ can be interpreted as a Bernoulli random variable when considering an ensemble of setting in which the scatterers are placed at random. $k_i(x_t, y_t) = 0$ if either the TX or the RX of the ith TRP does not have a LoS to $(x_t, y_t)$. Hence, $k_i(x_t, y_t)$ can be decomposed into a product of two terms as follows:

$$k_i(x_t, y_t) = v_{i_T}(x_t, y_t) w_{i_R}(x_t, y_t), \quad (2)$$

$$v_{i_T}(x_t, y_t) = \begin{cases} 1, & \text{if the } i_T\text{-th TX has LoS to } (x_t, y_t) \\ 0, & \text{else} \end{cases}$$

$$w_{i_R}(x_t, y_t) = \begin{cases} 1, & \text{if the } i_R\text{-th RX has LoS to } (x_t, y_t) \\ 0, & \text{else} \end{cases}$$

For brevity, $k_i(x_t, y_t)$ will be addressed as $k_{it}$. For the t-th target at $(x_t, y_t)$, the vectors are defined as $k_t = [k_{1t}\ k_{nt}]$, $v_t = [v_{1t}\ v_{Mxt}]$ and $wt = [w_{1t}\ w_{Mrt}]$. It can be seen that $kt = wt \otimes vt$, where $\otimes$ denotes the Kronecker product. $k_t$ is a vector of dependent Bernoulli random variables and represents the ground truth as far as the blocking characteristics at $(x_t, y_t)$ is concerned. $k_t$ can be estimated depending on which MPCs in r are classified as DPs to $(x_t, y_t)$. In order to do this, the following decision variables are defined as:

$$\tilde{k}_{ijt} = \begin{cases} 1, & \text{if } r_{ij} \text{ is a } DP \text{ to the } t\text{-th target} \\ 0, & \text{else} \end{cases} \quad (3)$$

Let $\tilde{k}_t=[\tilde{k}_{11t}\ \tilde{k}_{1N1t}\ \tilde{k}_{ijt}\ \tilde{k}_{nNnt}]$ denote the vector of decision variables corresponding to the t-th target. It is easy to see that the estimate of the ground truth $k_{it}$, denoted by $\tilde{k}_{it}$, is nothing but $$\sum_{j=1}^{N_i} \tilde{k}_{ijt}.$$

The vector $\hat{k}_t$ can be defined in a manner similar to $k_t$.

Assuming the presence of T targets, let $x=[x_1\ y_T]$, $y=[y_1\ y_T]$ denote the target locations. Also, let $\hat{k}=[\hat{k}_1 \ldots \hat{k}_T]$, $k=[k_1\ k_T]$ and $\tilde{k}=[\tilde{k}_1 \ldots \tilde{k}_T]$. The estimation of all target locations can be formulated as a Bayesian estimation problem in the following manner, $$\text{maximize}_{T,x,y,\tilde{k}} f_{DP}(r\,|\,x, y, \tilde{k}, k) \mathbb{P}(\hat{k}\,|\,x, y, k) \quad (4)$$

$$\mathbb{P}(k\,|\,x, y) f(x, y)$$

$$\text{s.t } \tilde{k}_{ijt}, \hat{k}_{it} \in \{0, 1\}, \forall\, i, j, t \quad (5)$$

$$\sum_j \tilde{k}_{ijt} = \hat{k}_{it} \quad (6)$$

where $f(:)$ and $P(:)$ denote a continuous probability density function (pdf) and a discrete probability mass function (pmf), respectively. The objective function in (4) is then simplified.

Firstly, $\mathbb{P}(k|x, y)$ is the same as $\mathbb{P}(k_1;\,;k_T)$. It captures the blocking statistics in its entirety. As mentioned earlier, any $k_t$ is a vector of dependent Bernoulli random variables. In addition, any two blocking vectors $k_t$ and $k_u$ are also dependent, in general. This is intuitive as it would be expected two nearby targets to experience similar blocking characteristics. A consequence of this dependence is that target-by-target localization is not optimal. However, for ease of computation, target-by-target detection is resorted to, thereby implicitly assuming independent blocking vectors at distinct locations, i.e., $\mathbb{P}(k_1;\,;k_T) \approx \Pi_t \mathbb{P}(k_t)$. The generalization to joint-target detection will be described in a future work.

Among the $2^n$ possible values for a n-length binary vector, $k_t$ can only take on $(2^{M_x}-1)(2^{M_r}-1)+1$ physically realizable values. Each of these has a decomposition of the form $w_t \otimes v_t$ and shall henceforth be referred to as consistent blocking vectors. All other binary vectors that cannot be decomposed as a Kronecker product are termed inconsistent. Moreover, if $k_t$ is inconsistent, $\mathbb{P}(k_t)=0$.

Secondly, $\mathbb{P}(\hat{k}|x, y, k)$ is the same as $\mathbb{P}(\hat{k}_1;\,;\hat{k}_T|k_1;\,;k_T)$. Assuming that an estimate $\hat{k}_{it}$ is conditionally independent of other estimates, given its ground truth $\hat{k}_{it}$, $$\mathbb{P}(\hat{k}_1;\ldots;\hat{k}_T\,|\,k_1;\ldots;k_T) = \prod_{i=1}^n \prod_{t=1}^T \mathbb{P}(\hat{k}_{it}\,|\,k_{it}) \quad (7)$$

Ideally $\hat{k}_{it}$ must equal $k_{it}$. However, since $\hat{k}_{it}$ is a random estimate of the ground truth $k_{it}$ (also a random variable, albeit one fixed by nature), there can be estimation errors. Two kinds of errors can be distinguished by:
a) $\hat{k}_{it}=0$, when in fact $k_{it}=1$. This happens when a failure to detect the DP corresponding to the t-th target at the i-th TRP because noise pushes the range estimate far away from the true value. If the noise is independent and identically distributed (i.i.d.) for all TRPs, it can be assumed that $\mathbb{P}(\hat{k}_{it}=0|k_{it}=1)=\rho_{01}$ for all i, t.
b) $\hat{k}_{it}=1$ when actually, $k_{it}=0$. This happens when the DP for the t-th target at the i-th TRP is blocked but we mistake a noise peak/IP for a DP because it has the right range. $\mathbb{P}(\hat{k}_{it}=1|k_{it}=0)$ depends on the IP distribution and varies according to TRP and target locations. In the absence of IP statistics, the simplifying assumption that $\mathbb{P}(k_{it}=1|k_{it}=0)$ is also a constant, $\rho_{10}$ is made. The availability of measurement-based statistics for these quantities would obviously improve estimation performance.

While an estimated blocking vector $\hat{k}_t$ can in principle take on all $2^n$ values, a false alarm is less likely if $\hat{k}_t$ is a short Hamming distance away from a consistent blocking vector that has high probability. Let $\mathcal{K}$ denote the set of all consistent blocking vectors. To simplify matters, any target location $(x_t, y_t)$ is discarded if there is no vector in $\mathcal{K}$ which is at most a unit Hamming distance away from $\hat{k}_t$. Given $\hat{k}_t$, let $\mathcal{K}_t \subseteq \mathcal{K}$ denote the set of consistent blocking vectors which are at most a unit Hamming distance away from $\hat{k}_t$. Thus, $$\mathbb{P}(\hat{k}_t) \approx \begin{cases} 0, & \text{if } \mathcal{K}_t \text{ is empty} \\ \sum_{k_t \in \mathcal{K}_t} \left(\prod_i \mathbb{P}(\hat{k}_{it}\,|\,k_{it})\right)\mathbb{P}(k_t), & \text{else} \end{cases} \quad (8)$$

Thirdly, given $\tilde{k}$, the distribution $f_{DP}(r|x, y, \tilde{k}, k)$ does not depend on k as it is not a decision variable. Therefore, $f_{DP}(r|x, y, \tilde{k}, k)=f_{DP}(r|x, y, \tilde{k})$. The distribution of r given $\tilde{k}$, x and y decomposes into product form as the noise on each $r_{ij}$ is independent. Thus, $$f_{DP}(r\,|\,x, y, \tilde{k}) = \prod_{i,j,t} \left(\frac{1}{\sqrt{2\pi}\,\sigma} \exp\left(-\frac{(r_{ij}-r_i(x_t, y_t))^2}{\sigma^2}\right)\right)^{\tilde{k}_{ijt}} \quad (9)$$

Finally, the target distribution $f(x, y)$ is assumed to be uniform. Hence, after taking logarithms, and assuming independent blocking vectors at distinct locations, (4) can be simplified as follows:

$$\text{minimize } \frac{1}{\sigma^2}\left[\sum_{i,j,t} \tilde{k}_{ijt}(r_{ij}-r_i(x_t, y_t))^2\right] - \quad (10)$$

$$\sum_t \log\mathbb{P}(\hat{k}_i) - \left(\sum_{i,j,t} \tilde{k}_{ijt}\right) \log\sqrt{2\pi}\,\sigma$$

$$\text{s.t } \tilde{k}_{ijt}, \hat{k}_{it} \in \{0, 1\}, \forall\, i, j, t, m \quad (11)$$

$$\sum_j \tilde{k}_{ijt} = \hat{k}_{it} \quad (12)$$

In order to solve the optimization problem in (10)-(12), a mechanism for detecting DPs corresponding to the same target is required. Let $q_t(r)$ denote the set of DPs corresponding to the t-th target. In terms of the solution to (10)-(12), $q_t(r)=\{r_{ij}\in r|\tilde{k}_{ijt}=1\}$. Henceforth, $q_t(r)$ is referred to as matching. In general, a matching $q_t(r)$ is a set containing at most one MPC per TRP since no point target can give rise to two or more resolvable DPs to a given TRP i. A target can be localized if a matching containing at least three DPs corresponding to it can be identified. For a matching q(r) and a point (x, y), the first term in (10) determines if the ellipses corresponding to MPCs in q(r) pass through (x, y) or not. The second term in (10) plays the role of a prior by determining the probability of the blocking vector obtained from q(r), at (x, y). The objective in (10) is minimized only when both these quantities are small. In the next section, the method of obtaining the correct matchings is described while taking into account the blocking statistics.

The number of matchings possible for T targets, n TRPs and N MPCs per TRP is) $((_3^n)N^3+(_4^n)N^4+ \ldots +(_n^n)N^n)^T$. Hence, the computational complexity of a brute force search over all possible matchings is $O(N^{nT})$, which is intractable for a large number of TRPs and/or targets. In order to obtain the correct matchings in a tractable manner, the correct matchings are built on iteratively. Consider, without loss of generality, a matching $q_t^{(l-1)}(r)$ for the t-th target consisting of MPCs from the first l–1 TRPs (3≤l≤n). Let these MPCs be denoted by $$\{r_{1_{j_1}}, \ldots, r_{l-1_{j_{l-1}}}\}.$$

Given an initial matching $q_t^{(l-1)}(r)$, let $(\hat{x}_t^{l-1}, \hat{y}_t^{l-1})$ denote its corresponding target location estimate. For an $$MPC r_{l_{j_l}}$$

of the l-th TRP, we define the following function, $$L(q_t^{(l-1)}(r); r_{l_{j_l}}) = r_{l_{j_l}} - r_l(\hat{x}_t^{(l-1)}, \hat{y}_t^{(l-1)}) \quad (13)$$

If $$q_t^{(l-1)}(r) \cup \{r_{1_{j_1}}\}$$

consists entirely of DPs from a single target at $$(x_t, y_t), L(q_t^{(l-1)}(r); r_{l_{j_l}})$$

should be very small in magnitude. Using a Taylor's series approximation, it can be shown that $$L(q_t^{(l-1)}(r); r_{l_{j_l}})$$

is normally distributed with zero mean. Let $(\hat{x}_t^l, \hat{y}_t^l)$ denote the target location estimate obtained from $$q_t^{(l-1)}(r) \cup \{r_{l_{j_l}}\}$$

and let $\hat{k}_t^{(l)} = [\hat{k}_{1t} \ldots \hat{k}_{lt}]$ denote the estimated l-length blocking vector at $(\hat{x}_t^l, \hat{y}_t^l)$. If $$q_t^{(l-1)}(r) \cup \{r_{l_{j_1}}\}$$

consists entirely of DPs from the t-th target, then both $$L(q_t^{(l-1)}(r); r_{l_{j_l}})$$

and $-\log \mathbb{P}(\hat{k}_t^{(l)})$ must be very small. Therefore, two thresholds, $\delta$ and $\mu$, are defined and a composite blocking-aware likelihood function, $$L_B(q_t^{(l-1)}(r); r_{l_{j_l}}),$$

as follows:

$$L_B(q_t^{(l-1)}(r); r_{l_{j_l}}) = \left[\left|\frac{L(q_t^{(l-1)}(r); r_{l_{j_l}})}{\sigma(q_t^{(l-1)}(r); r_{l_{j_l}})}\right|, -\log \mathbb{P}(\hat{k}_t^{(l)})\right] \quad (14)$$

where $$\sigma(q_t^{(l-1)}(r); r_{l_{j_l}})$$

is the standard deviation of $$L(q_t^{(l-1)}(r); r_{l_{j_l}}).$$

If $$\left|\frac{L(q_t^{(l-1)}(r); r_{l_{j_l}})}{\sigma(q_t^{(l-1)}(r); r_{l_{j_l}})}\right| < \delta$$

and $-\log \mathbb{P}(\hat{k}_t^{(l)}) < \mu$, then $$q_t^{(l)}(r) = q_t^{(l-1)}(r) \cup \{r_{l_{j_l}}\}.$$

Otherwise, $q_t^{(l)} = q_t^{(l-1)}(r)$.

This motivates an algorithmic approach that is divided into stages, indexed by l. In general, let $(z_1, z_2, \ldots z_n)$, a permutation of $(1; 2; , n)$, be the order in which TRPs are processed. At the beginning of the l-th stage (3≤l≤n), each matching $q_t^{(l-1)}(r)$ has at most l–1 MPCs. During the l-th stage, all the DPs are identified among the MPCs of the $z_l$-th TRP to obtain $q_t^{(l)}(r)$ for all t. It is possible for there to exist multiple matchings for the same target. This occurs whenever a matching is inconsistent. A matching $q_t^{(l)}(r)$ is said to be consistent (inconsistent) if the estimated blocking vector, $\hat{k}_t^{(l)}$, is consistent (inconsistent). A finite value of $\mu$ ensures that an inconsistent vector $\hat{k}_t^{(l)}$ is a unit Hamming distance away from being consistent (8). Let $\mathcal{K}_t^{(l)}$ denote all the consistent l-length blocking vectors a unit Hamming distance from an inconsistent $\hat{k}_t^{(l)}$. For each $k_t^{(l)} \in \mathcal{K}$, there exists a matching that can be derived from $q_t^{(l)}(r)$ which reflects the ground truth implied by $k_t^{(l)}$. All such matchings are stored in a structure $M^{(t)}$ and at the end of the n-th stage, the matching $q_t^{(m)}(r) \in M^{(t)}$ with the lowest value of the objective function in (10) is declared as the true matching for the t-th target. The location of the t-th target can then be estimated from this matching.

Finally, how to obtain an initial set of matchings that can be used for the third stage is described. Let $P(i, l, j_i, j_l)$ denote the set of points at which the ellipses corresponding to the $j_1$-th MPC of the i-th TRP and the $j_l$-th MPC of the l-th TRP intersect. There can be at most four points in any $P(i, l, j_i, j_l)$. For a matching $$q_t^{(2)}(r) = \{r_{i,j_i}, r_{l,j_l}\},$$

the target location estimate $(\hat{x}_t^{(2)}, \hat{y}_t^{(2)})$ need not be unique. In fact, all the points in $P(i, l, j_i, j_l)$ are ML estimates of the target location for $q_t^{(2)}(r)$. For the initial set of matchings, $P(z_1, z_2; j_{z_1}, j_{z_2})$ is computed for all $1 \leq j_{z_1} \leq N_{z_1}$, $1 \leq j_{z_2} \leq N$. Each point $(x, y) \in P(z_1, z_2; j_{z_1}, j_{z_2})$ gives rise to a prospective target location $(\hat{x}^{(2)}, \hat{y}^{(2)}) = (x, y)$ and matching $$q^2(r) = \{r_{z_1, j_{z_1}}, r_{z_2, j_{z_2}}\}.$$

Essentially, any intersection of two ellipses is a prospective target location to begin with.

The pseudo code for the algorithm is presented in Algorithm 1. Two data structures, P and M, are used to keep track of target locations. P is a collection of all $P(.,.,.,.)$'s defined previously, which stores the points of intersection of pairs of ellipses. M is a collection of all $M^{(t)}$'s and contains matchings of size three or more and the corresponding target locations. In each stage, points may move from P to M. Care should be taken not to have the same point in both P and M as this could lead to counting the same target twice. The final target locations will be determined from M.

It is easy to see that the concentration of ellipse intersections would be denser around target locations. As a result, it is helpful to visualize the Bayesian MTL algorithm, labeled as Algorithm 1 as noted below, as a method of clustering 'closely located' ellipse intersections. For n TRPs and N MPCs per TRP, the total number of ellipse intersections is $O(n^2 N^2)$, which is polynomial in the number of TRPs and targets. Hence, it is intuitive that the clustering performed in Algorithm 1 should also have polynomial complexity in the number of TRPs and targets. It is important to note that no assumptions have been made on the blocking distribution and as a result, Algorithm 1 can be applied to empirical blocking distributions (obtained by either measurements or simulations) as well.

Previous attempts before the above Bayesian MTL algorithm did not address the ambiguity that arises due to indirect paths and/or multiple tags. Before the above Bayesian MTL algorithm, the structural mode response was typically not used for tag localization as it was not unique across different tags. Hence, the antenna mode was used for both localization as well as identification. As a result, a lot of effort has been devoted towards designing 'customized' antennas whose antenna mode response is as strong as the structural mode. For example, look to equation (15) below.

Figure 2:
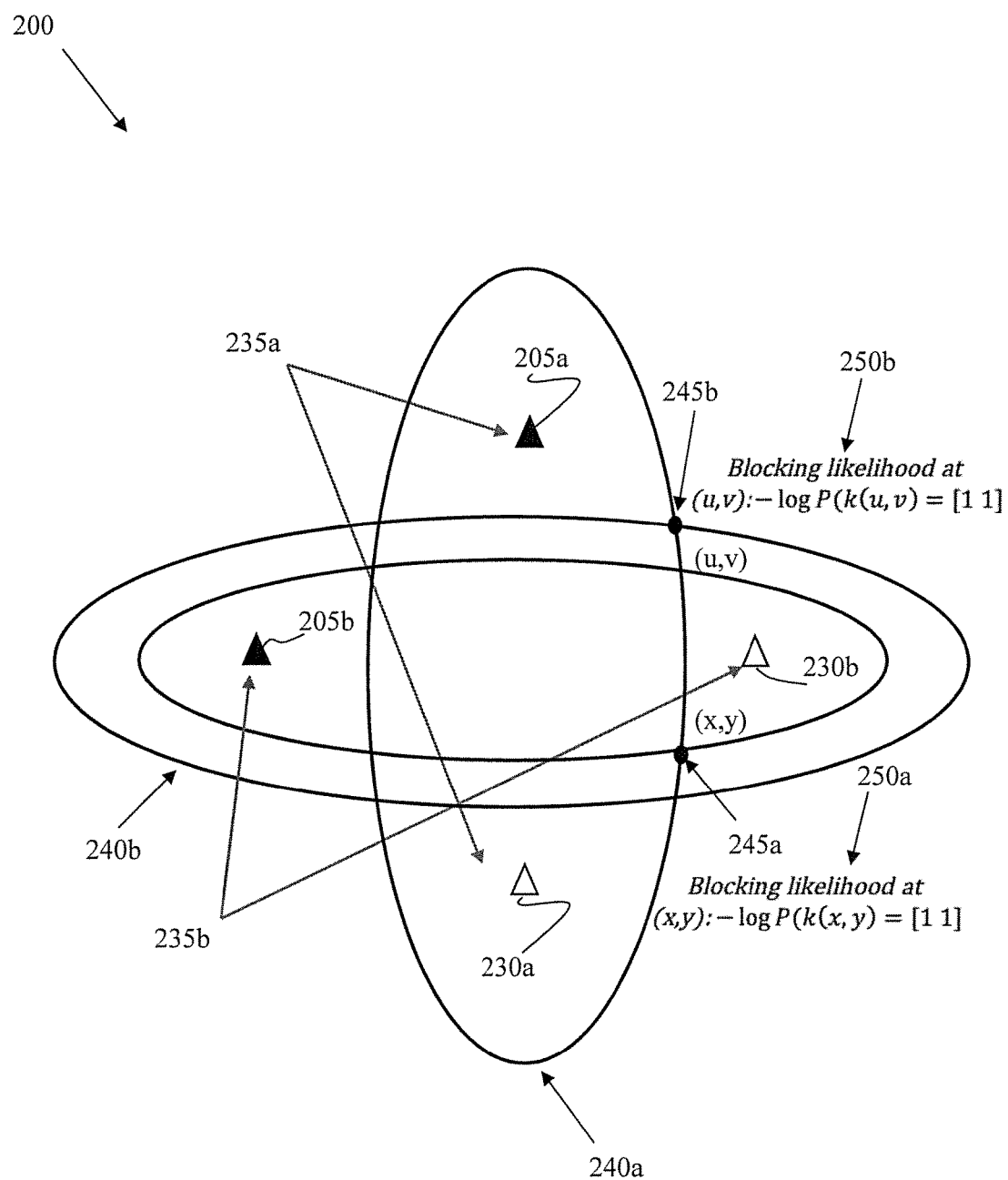
FIG. 2 shows a framework for a localization determination using blocking likelihoods in accordance with aspects of the invention.

Since the above Bayesian MTL algorithm can distinguish between tags that have the same structural mode response, the Bayesian MTL algorithm can be used for any kind of tag antenna (tag), including those whose antenna mode response is not as strong as the structural mode. In addition, the localization techniques discussed below in FIGS. 2 and 3 are also expected to improve the localization performance of customized tag antennas since the strong antenna mode is augmented by the structural mode. For example, equation (18) below.

Algorithm 1 Algorithm for solving the Bayesian multi-target localization problem 1: Initialize M = NULL, P = NULL, t = 0
 2: Obtain the TRP processing order $(z_1, z_2, \ldots, z_n)$ [1]
 3: for each $j_{z_1}$ and $j_{z_2}$ do
 4:    Compute all entries of $P(z_1, z_2, j_{z_1}, j_{z_2})$
 5: end for
 6: for l = 3 to n do
 7:    for each $(x, y) \in P(z_u, z_v, j_{z_u}, j_{z_v})$, $(u, v \in \{1, \ldots, l-1\})$, $j_u \in \{1, \ldots, N_{z_u}\}$, $j_v \in \{1, \ldots, N_{z_v}\}$)) and each $r_{z_l, j_{z_l}}$ do
 8:      $q_t^{(l-1)}(r) = \{r_{z_u, j_{z_u}}, r_{z_v, j_{z_v}}\}$
 9:      If $L_B \; q^{(l-1)}(r); r_{z_l, j_{z_l}}) < (\delta, \mu)$ then
10:        t = t + 1
11:        $q_t^{(l)}(r) = q_t^{(l-1)}(r) \cup \{r_{z_l, j_{z_l}}\}$
12:        Compute $(\hat{x}_t^{(l)}, \hat{y}_t^{(l)})$ and remove $(x, y)$ from $P(z_u, z_v, j_{z_u}, j_{z_v})$
13:        Add $q_t^{(l)}(r)$ to $M^{(t)}$
14:        Derive $\hat{k}_t^{(l)}$ from $q_t^{(l)}(r)$
15:        if $\hat{k}_t^{(l)}$ is inconsistent then
16:          for each $k_t^{(l)} \in \mathcal{K}_c^{(l)}$ do
17:            Obtain the corresponding $q_{t'}^{(l)}(r)$ and $(\hat{x}_{t'}^{(l)}, \hat{y}_{t'}^{(l)})$ and append to $M^{(t)}$
18:          end for
19:        end if
20:      end if
21:    end for
22:    if l > 3 then
23:      for each t do
24:        for each $q_t^{(l-1)}(r) \in M^{(t)}$ do
25:          if $L_B \; q^{(l-1)}(r); r_{z_l, j_{z_l}}) < (\delta, \mu)$ then
26:            $q_t^{(l)}(r) = q_t^{(l-1)}(r \cup \{r_{z_l, j_{z_l}}\}$
27:            Derive $\hat{k}_t^{(l)}$ from $q_t^{(l)}(r)$
28:            if $\hat{k}_t^{(l)}$ is inconsistent then
29:              for each $k_t^{(l)} \in \mathcal{K}_c^{(l)}$ do
30:                Obtain the corresponding $q_{t'}^{(l)}(r)$ and $(\hat{x}_{t'}^{(l)}, \hat{y}_{t'}^{(l)})$ and append to $M^{(t)}$
31:             end for
32:           end if
33:         end if
34:        end for
35:      end for
36:    end if
37: end for
38: for each t do
39:    Select the $q_t^{(m)}(r)$ in $M^{(t)}$ that minimizes (10) and return the corresponding $(\hat{x}_t^{(m)}, \hat{y}_t^{(m)})$
40: end for Returning back to FIGS. 1-3, in general, the backscattering phenomenon can be modeled using a linear time-invariant (LTI) system, which is characterized by an impulse response, h(t), or equivalently, a frequency response, H(f) (note that h(t) and H(f) are Fourier transform pairs). For a particular antenna design, h(t) and H(f) may be determined through measurements. Alternately, a desired frequency response H(f) may also be realized through the use of frequency selective surfaces (FSS) or electromagnetic band-gap structures (EBG). Using h(t), the backscattered signal, such as the backscattered signals 125*a*, 125*b*, 125*c*, 125*d*, 125*e*, and 125*f* of FIG. 1, may be separated from the background clutter using a matched filter. In additional, any other background subtraction technique may also be employed to mitigate the clutter.

For a given TRP and tag, such as the TRPs 235a and 235b of FIG. 2 and the tag 115a of FIG. 1, the backscattered signal may consist of many multi-path components (MPCs), in general. The direct path (DP) may or may not exist. In addition, a number of indirect paths (IPs) may exist. An example of an IP includes TX→Tag→Wall→RX or TX→Wall→Tag→RX, among other examples. A number of IPs may also exist due to the reflections off other obstacles may. Given a MPC, any mechanism to separate the structural and antenna modes may be used (e.g. the length of the antenna feed line determines the delay between the early and late-time responses, which may then be used to separate the early and late-time responses). Let r denote the delay between the structural and antenna modes. The time-of-arrival of the MPC gives rise to a range estimate, denoted by r.

The structural and antenna mode responses can be separated and optimally combined, for example equations 15-18 listed below, through software if the delay, $\tau$, between the responses is known. The value of $\tau$ is a function of the antenna type and can be obtained using measurements and/or simulations. In addition, the Bayesian MTL algorithm would also have to be implemented in software and/or hardware, and its implementation in software and/or hardware is discussed below along with the description of FIG. 4.

The distance information contained in the structural and antenna mode signals, denoted by $r_s$, and $r_a$, respectively, can be written as follows:

$$r_s = r + n_s \quad (15)$$

$$r_a = r + c\tau + n_a \quad (16)$$

where c is the speed of light and $n_s$ and $n_a$ denote the additive noise corrupting the structural and antenna mode responses, respectively, at the reader. Let $\sigma_s^2$ and $\sigma_a^2$ denote the noise power in the structural and antenna modes, respectively. The optimum estimate of r that maximizes the signal-to-noise ratio (SNR) is given by:

$$\hat{r} = \lambda r_s + (1-\lambda) r_a \quad (17)$$

where $\lambda$ is the solution to the following optimization problem:

$$\min \lambda^2 \sigma_s^2 + (1-\lambda)^2 \sigma_a^2 \; s.t. \; 0 \leq \lambda \leq 1 \quad (18)$$

Based on the solution to (18), each MPC corresponds to an ellipse such that the sum of the distances from every point on the ellipse to the corresponding TX device and RX device (which are at the foci) equals $\hat{r}$. The following cases are of interest:
(1) If the antenna mode component is strong enough, then all the range estimates corresponding to the tag/product (i.e. DPs and IPs) from the different TRPs can be unambiguously identified. However, it is not straightforward to distinguish between the DPs and IPs for a particular tag since they all have the same radar signature. Although a DP has an earlier time-of-arrival w.r.t the IPs, the first arriving MPC need not be a DP; it could be an IP if the DP is blocked.
(2) For some antenna designs, the antenna mode may be orders of magnitude weaker than the structural mode (i.e., $\sigma_a \gg \sigma_s$). In such cases, $\lambda \approx 1$ and the product cannot be uniquely identified. However, all the tags can still be localized using only the structural mode but it is not straightforward to distinguish between multiple tags, since all tags of the same type have the same structural mode response.

In both cases of (1) and (2) above, the DPs corresponding to a tag need to be identified for localization. This process is referred to as matching. Given n TRPs and $N_i$ MPCs at the i-th TRP ($1 \leq i \leq n$), the Bayesian MTL obtains a matching iteratively in the following manner: for the first two TRPs, every pair of ellipse intersections (corresponding to a pair of MPCs) is treated as a potential tag location. For example, consider the two ellipses 240a and 240b intersecting at (x, y) in FIG. 2.

Referring to FIG. 2, every intersection of ellipses 240a and 240b, such as intersection points 245a and 245b, is a potential tag location. The blocking likelihoods 250a and 250b at two such points, such as intersection points 245a and 245b, also referred to as points (x,y) and (u,v), are shown. More specifically, the blocking likelihood 250a at (x,y) point 245a is represented by the function $-\log P(k(x, y)=[1\ 1])$. The blocking likelihood 250b at (u,v) point 245b is represented by the function $-\log P(k(u, v)=[1\ 1])$.

Assuming that there are DPs corresponding to a tag, such as tag 120a or 120b of FIG. 1, at (x,y) point 245a, a blocking vector can be defined as $k(x, y)=[k_1(x, y)\ k_2(x, y)]=[1\ 1]$, where, $$k_i(x, y) = \begin{cases} 1, & \text{if } (x, y) \text{ is not blocked to i-th TRP} \\ 0, & \text{else} \end{cases}$$

The likelihood of the assumptions about (x, y) being true is determined by the blocking likelihood at (x, y) point 245a given by blocking likelihood 250a represented by function $-\log P(k(x, y))$, where $P(\cdot)$ is the probability operator. A low value of the blocking likelihood signifies a higher probability of a tag being present. Hence, if $-\log P(k(x, y))$ is greater than a pre-defined threshold, $\mu$, then we conclude that a tag is not present at (x, y). Specifically, if blocking likelihood 250a or 250b is below a threshold, then it can be concluded that a tag does not exist the at corresponding intersection point, such as intersection points 245a and 245b. Similarly, the blocking likelihoods can be computed at all the other ellipse intersections on the assumption that they are also tag locations.

FIG. 2 further illustrates a localization determination 200 for objects within an environment, such as radar environment 100 of FIG. 1. Transmitters (TX) devices 205a and 205b operate in the same manner as the TX device 105 of FIG. 1. That is, TX devices 205a and 205b each emit a transmitter signal that flows through the radar environment, eventually reaching one or more targets/objects within the environment. Again, each target/object includes a tag antenna (tag) associated with it. The transmitter signals of TX devices 205a and 205b will reach the tag of each object.

The tags will receive the transmitter signals and then generate backscatter signals. Again, these backscattered signals, just like signals 125a, 125b, 125c, 125d, 125e, and 125f of FIG. 1, include a superposition of two components, (i) a structural mode and (ii) an antenna mode. These backscattered signals are received at multiple readers (RXs) 230a and 230b. As shown in FIG. 2, a transmitter and a reader form a pair, referred to as a TRP. FIG. 2 illustrates TRP 235a, which is a pair between TX device 205a and RX device 230a. FIG. 2 also illustrates TRP 235b, which is a pair between TX device 205b and RX device 230b.

Each TRP, such as TRPs 235a and 235b, has an ellipse, such as ellipse 240a and 240b, drawn around it. These ellipses can provide insight into the tag location within the environment. More specifically, the ellipses intersect at various points, such as points 245a and 245b. These intersection points can indicate a potential tag location. By taking points 245a and 245b into account, their blocking likelihoods 250a and 250b are calculated. Specifically, the blocking likelihood 250a at (x,y) point 245a is represented by the function $-\log P(k(x, y)=[1\ 1])$. The blocking likelihood 250b at (u,v) point 245b is represented by the function $-\log P(k(u, v)=[1\ 1])$.

The blocking likelihoods 250a and 250b are then compared to a pre-defined threshold, $\mu$, to determine whether the intersection point, such as intersection points 245a or 245b, are correctly a tag location. If the blocking likelihood is greater than the pre-defined threshold, then it can be concluded that a tag is not present at the intersection point. Since the tag is not present, then a target/object is not present as well. Therefore, if the blocking likelihood 250a of intersection point 245a, which is denoted as (x, y) is greater than the pre-defined threshold, then the target/object is not localized at intersection point 245a. The same analysis and reasoning can be applied to blocking likelihood 250b and intersection point 245b, which is denoted by (u, v).

Now, looking to FIG. 3, an additional ellipse, such as ellipse 370 which is in addition to a plurality of first ellipses 340a and 340b, is shown. Additional ellipse 370 is created from an additional TRP 365, which is in addition to the TRPs 335a and 335b of the plurality of first ellipses 340a and 340b. When ellipses corresponding to the i-th TRP are being considered, the blocking vectors at all potential tag locations have length i. Every ellipse is considered a potential DP and the blocking likelihood of all intersection points are updated every time a new ellipse is processed by the algorithm.

Still referring to FIG. 3, it can be seen that this additional ellipse 370 passes through intersection point 345a, also denoted as (x, y). However, it is not immediately concluded that a tag is present at (x, y), but merely an update to its blocking likelihood occurs. Therefore, by the additional ellipse 370 passing through intersection point 345a, the blocking likelihood 350a is updated. This is shown by comparing the blocking likelihood 250a of FIG. 2 with the blocking likelihood 350a of FIG. 3. As can be readily seen, the blocking likelihood 250a is equal to [1 1] while the blocking likelihood 350a is equal to [1 1 1].

The remaining intersection points, such as points 345b and 375a, 375b, 375c, 375d, 375e, 375f, and 375g, can also be tag locations. For example, a tag at intersection point 345b, denoted as (u, v), may be blocked with respect to the additional TRP, TRP 365 formed between TX device 355 and RX device 360. Hence, there is no ellipse passing through this point, as illustrated in FIG. 3. If that is the case, then an update to the blocking vector to [1 1 0] occurs and a new blocking likelihood is computed, as shown by blocking likelihood 350b. Specifically, comparing the blocking likelihood 250b with the blocking likelihood 350b shows that the blocking likelihood 250b is equal to [1 1] while the blocking likelihood 350b is equal to [1 1 0]. This change in blocking likelihoods can be attributed by a blocking caused by the additional TRP 365.

Continuing with FIG. 3, the additional ellipse 370 can also create new intersections. For example, intersection points, 375b, 375c, 375d, 375e, 375f, and 375g occur because of the additional ellipse 370. Each of these is also a prospective target location, such as intersection point 375a, which is also denoted as coordinate(p, q). Specifically, each of these additional points can have a suitable blocking vector derived, based on the ellipses that pass through the respective point, and its blocking likelihood can then be computed. For example, the intersection point 375a can have a blocking likelihood 380 computed.

Thus, the Bayesian MTL algorithm evolves by keeping track of all ellipse intersections every time ellipses from a new or additional TRP are considered. Again, just like the localization 200 of FIG. 2, those ellipse intersections in localization 300 whose blocking likelihood exceeds pre-defined threshold $\mu$ are eliminated as tag locations. At the other end, all the surviving ellipse intersections are declared to be tag locations.

FIG. 3 further illustrates an additional localization 300 determination that occurs through the use of updated blocking likelihoods. More specifically, localization 300 occurs by utilizing additional TRPs that generate additional ellipses, which generate additional points of intersection and also update the blocking likelihoods of existing intersection points. Just like the localization 200 of FIG. 2, every intersection of ellipses 340a and 340b, such as intersection points 345a and 345b, is a potential tag location. Now, in FIG. 3, with the addition of the new ellipse 370 generated by a new TRP 365, more points of intersection between the ellipses occurs.

These new points of intersection points 375a, 375b, 375c, 375d, 375e, 375f, and 375g can also be tag locations. Therefore, by using a blocking vector, each point of intersection can have a blocking likelihood calculated. For example, new intersection point 375a, which is also denoted as coordinate(p, q), can have a blocking likelihood 380 which is calculated as $-\log P(k(p, q)=[1\ 0\ 1])$, as shown in FIG. 3. Again, just like the blocking likelihoods 250a and 250b of FIG. 2, and the updated blocking likelihoods 350a and 350b, the blocking likelihood 380 is compared to a pre-defined threshold, $\mu$, to determine whether that specific intersection point is a tag location. If the blocking likelihood 380 is greater than the pre-defined threshold, then it can be concluded that a tag is not present at the intersection point 375a. However, just like the other blocking likelihoods, if the blocking likelihood 380 is less than the pre-defined threshold, then it can be concluded that a tag is present at the intersection point 375a.

The plurality of first ellipses 340a and 340b, just like the ellipses 240a and 240b, are generated by TRPs. Specifically, TX device 305a and RX device 330a form the TRP 335a, which generates ellipse 340a, just like TX device 205a and RX device 230a form TRP 235a, which generates ellipse 240a. TX device 305b and RX device 330b form the TRP 335b, which generates ellipse 340b, just like TX device 205b and RX device 230b form TRP 235b, which generates ellipse 240b. Now by adding additional location data to the localization framework, there can be a further determination of localizing objects within the environment. In any case, the location of the devices is obtained by computing the intersection of the ellipses, in that the ellipses are determined by a runtime of the MPCs. The difference between structural and antenna modes is that structural mode has an identifier, so it is possible to know which ellipses belong together. In comparison, the antenna mode does not have an identifier. Further, the tag does not need to be reprogrammed when location changes.

For example, additional location data is generated by the additional TRP 365. This additional TRP 365 is formed by TX device 355 and RX device 360, which generate the additional ellipse 370. The additional ellipse 370 will intersect with the plurality of first ellipses 340a and 340b, which represent the received location data. The additional ellipse 370 will also cause the blocking likelihoods 350a and 350b to be updated. Then all of these blocking likelihoods will be compared to a pre-defined threshold to determine if the respective intersection point is a tag location or not. It should be noted that additional TX devices and RX devices can be added to the environment, thereby adding additional TRPs and therefore generating additional ellipses. Again, these additional ellipses will create intersection points between all the ellipses, and the blocking likelihoods at each intersection point can be calculated and compared to a threshold to determine if the intersection point is a tag location.

FIG. 4 shows a computer infrastructure 400 for implementing the steps in accordance with aspects of the disclosure. To this extent, the infrastructure 400 can implement the capture of the location data from the TRPs and also the analysis of the location data. For example, the infrastructure 400 can generate the ellipses of TRPs and also compute the blocking vectors along with the blocking likelihoods. Further, the infrastructure 400 can compare the blocking likelihoods to any desired threshold. The infrastructure 400 includes a server 405 or other computing system that can perform the processes described herein. In particular, the server 405 includes a computing device 410. The computing device 410 can be resident on a network infrastructure or computing device of a third party service provider (any of which is generally represented in FIG. 4).

The computing device 410 includes a processor 415 (e.g., CPU), memory 425, an I/O interface 440, and a bus 420. The memory 425 can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 410 is in communication with external I/O device/resource 445 and storage system 450. For example, I/O device 445 can comprise any device that enables an individual to interact with computing device 410 (e.g., user interface) or any device that enables computing device 410 to communicate with one or more other computing devices using any type of communications link. The external I/O device/resource 445 may be for example, a handheld device, PDA, handset, keyboard etc.

In general, processor 415 executes computer program code (e.g., program control 430), which can be stored in memory 425 and/or storage system 450. Moreover, in accordance with aspects of the invention, program control 430 controls a backscatter analysis component 435, which performs the processes described herein. Specifically, the backscatter analysis component 435 can contain the Bayesian MTL algorithm that will analyze the structural mode of the backscatter signal. The backscatter analysis component 435 can be implemented as one or more program codes in program control 430 stored in memory 425 as separate or combined modules.

Additionally, the backscatter analysis component 435 may be implemented as separate dedicated processors or a single or several processors to provide the function of this tool. While executing the computer program code, the processor 415 can read and/or write data to/from memory 425, storage system 450, and/or I/O interface 440. The program code executes the processes of the invention. The bus 420 provides a communications link between each of the components in computing device 410.

The backscatter analysis component 435 is utilized to perform an analysis of the backscatter signal generated by the tag. More specifically, the backscatter signal will have two components: (i) a structural mode and (ii) an antenna mode. Both of these modes will contain location data. The backscatter analysis component 435 will utilize the Bayesian MTL algorithm to analyze the structural mode for location data. For example, the backscatter analysis component 435 can separate the structural mode and antenna mode responses through software when the delay, $\tau$, between the responses is known. The value of $\tau$ is a function of the antenna type and can be obtained using measurements and/or simulations. In addition to the software to separate the modes, the Bayesian MTL algorithm would also be implemented in software and/or hardware as part of the backscatter analysis component 435.

The backscatter analysis component 435 allows for challenges associated with the structural mode to be overcome. By overcoming these challenges, location information contained in the structural mode may be exploited as well. This results in a signal-to-noise ratio (SNR) gain, which yields improved location estimates for the tags. For example, to overcome the problem of two or more tags of a same model having the same structural mode, and therefore having the same radar signature, the backscatter analysis component 435 utilizes the Bayesian MTL algorithm. The Bayesian MTL algorithm is capable of localizing an unknown number of targets/objects, all having the same radar signature. Hence, even in the absence of a unique antenna mode response, this algorithm can be used for localizing multiple tags.

It is noted that several aspects of the invention require the use of a computer network, computer system, and computing devices. For example, the transmitters and readers can be in communication with the computer infrastructure 400 directly. Additionally, the tag antennas can also be can be in communication with the computer infrastructure 400 directly. Further, a display can be associated with the computer infrastructure 400 directly so as to display the results of the received location data. Examples of the results include the generated ellipses, including the plurality of first ellipses and the additional ellipses.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A method comprising:
   receiving, by a computing device, location data of an object from a plurality of transmitter-reader pairs (TRPs);
   generating, by the computing device, a plurality of first ellipses representing the received location data;
   determining, by the computing device, blocking likelihoods at points of intersection between the plurality of first ellipses;
   generating, by the computing device, additional ellipses representing additional location data received from additional TRPs; and updating, by the computing device based on the additional ellipses, the blocking likelihoods at points of intersection between the plurality of first ellipses and the additional ellipses, wherein the location data and the additional location data include data from a structural mode of an antenna associated with the object.

2. The method of claim 1, wherein the points of intersection between the plurality of first ellipses and the additional ellipses represent a potential object location.

3. The method of claim 2, further comprising:

comparing the blocking likelihoods to a threshold; and eliminating blocking likelihoods which exceed the threshold, wherein a surviving point of intersection represents an actual location of the object.

4. The method of claim 1, wherein the location data further includes multipath components (MPCs).

5. The method of claim 4, wherein each ellipse represents the MPCs.

6. The method of claim 1, wherein determining the blocking likelihood or updating the blocking likelihood is based on an expression of $-\log P(k_t)$, in which $k_t$ represents a blocking vector.

7. The method of claim 1, wherein receiving the location data from the TRPs includes receiving a backscattered signal from the antenna.

8. The method of claim 7, wherein the backscattered signal is a superposition of the structural mode and an antenna mode of the antenna.

9. A computer program product for identifying an object location, the computer program product comprising a computer readable storage medium having program instructions embodied therewith, the program instructions executable by a computing device to cause the computing device to:

select a plurality of transmitter-reader pairs (TRPs) in an environment;

generate a plurality of first ellipses representing location data received from the selected TRPs;

determine a blocking likelihood at points of intersection between the plurality of first ellipses;

generate additional ellipses representing additional location data received from additional TRPs; and update, based on the additional ellipses, the blocking likelihood at the points of intersection between the plurality of first ellipses and the additional ellipses, wherein the location data and the additional location data include data from a structural mode of an antenna associated with the object.

10. The computer program product of claim 9, wherein the points of intersection between the plurality of first ellipses and the additional ellipses represent a potential object location.

11. The computer program product of claim 10, wherein the program instructions further cause the computing device to:

compare the blocking likelihoods to a threshold; and eliminate the blocking likelihoods which exceed the threshold, wherein a surviving point of intersection represents an actual location of the object.

12. The computer program product of claim 9, wherein determining the blocking likelihood or updating the blocking likelihood is based on an expression of $-\log P(k_t)$, in which $k_t$ represents a blocking vector.

13. The computer program product of claim 9, wherein each ellipse represents multipath components (MPCs).

14. The computer program product of claim 9, wherein receiving the location data from the TRPs includes receiving a backscattered signal from the antenna.

15. The computer program product of claim 14, wherein the backscattered signal is a superposition of the structural mode and an antenna mode of the antenna.

16. A system comprising:

a CPU, a computer readable memory and a computer readable storage medium associated with a computing device;

program instructions to generate a plurality of first ellipses representing multipath components (MPCs) extracted from a plurality of transmitter-reader pairs (TRPs);

program instructions to determine a blocking likelihood at points of intersection between the plurality of first ellipses;

program instructions to generate additional ellipses representing MPCs extracted from additional TRPs; and program instructions to update, based on generating the additional ellipses, the blocking likelihoods at the points of intersection between the first plurality of ellipses and the additional ellipses, wherein the MPCs include data from a structural mode of an antenna associated with an object, and the program instructions are stored on the computer readable storage medium for execution by the CPU via the computer readable memory.

17. The system of claim 16, wherein the points of intersection between the plurality of first ellipses and the additional ellipses represent a potential object location.

18. The system of claim 16, further comprising:

program instructions to compare the blocking likelihoods to a threshold; and program instructions to eliminate the blocking likelihoods which exceed the threshold, wherein a surviving point of intersection represents an actual location of the object.

19. The system of claim 16, wherein determining the blocking likelihood or updating the blocking likelihood is based on an expression of $-\log P(k_t)$ in which $k_t$ represents a blocking vector.

20. The system of claim 16, wherein the MPCs are from a backscattered signal generated by the antenna which is a superposition of the structural mode and an antenna mode of the antenna.

* * * * *